United States Patent
Peng et al.

(10) Patent No.: US 11,496,960 B2
(45) Date of Patent: Nov. 8, 2022

(54) ROOT NODE SELECTION SYSTEM

(71) Applicant: REALTEK SEMICONDUCTOR CORP., Hsinchu (TW)

(72) Inventors: Zuo-Hui Peng, Hsinchu (TW); Zhao-Ming Li, Hsinchu (TW); Guo-Feng Zhang, Hsinchu (TW); Jing-Jun Wu, Hsinchu (TW); Cui Ding, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 94 days.

(21) Appl. No.: 17/197,620

(22) Filed: Mar. 10, 2021

(65) Prior Publication Data
US 2022/0159564 A1  May 19, 2022

(30) Foreign Application Priority Data
Nov. 16, 2020 (CN) .......................... 202011275370.8

(51) Int. Cl.
*H04W 48/20* (2009.01)
*H04W 24/10* (2009.01)
(Continued)

(52) U.S. Cl.
CPC ........... *H04W 48/20* (2013.01); *H04W 24/10* (2013.01); *H04W 40/244* (2013.01); *H04W 48/16* (2013.01); *H04W 84/18* (2013.01)

(58) Field of Classification Search
CPC ... H04W 48/20; H04W 48/16; H04W 52/325; H04W 72/082; H04W 72/083;
(Continued)

(56) References Cited

U.S. PATENT DOCUMENTS 9,137,713 B2 * 9/2015 Radulescu .......... H04W 52/325
9,253,647 B2 * 2/2016 Bontu .................... H04W 16/14
(Continued)

FOREIGN PATENT DOCUMENTS

WO   WO-2014124048 A1 *  8/2014  .......... H04B 7/0695
WO   WO 2017/161361 A2      9/2017

OTHER PUBLICATIONS

Y. Z. Jembre and Y. Choi, "Distributed and Jamming-Resistant Channel Assignment and Routing for Multi-Hop Wireless Networks," in IEEE Access, vol. 6, pp. 76402-76415, 2018, doi: 10.1109/ACCESS.2018.2883073. (Year: 2018).*

*Primary Examiner* — William D Cumming
(74) *Attorney, Agent, or Firm* — Birch, Stewart, Kolasch & Birch, LLP

(57) ABSTRACT

A root node selection system includes a plurality of idle nodes, and each idle node has a signal quality parameter. The each idle node is configured to broadcast a signal beacon and monitor other signal beacons, where each signal beacon carries the corresponding signal quality parameter. Any of the idle nodes is used as a to-be-selected node, and the to-be-selected node stores a signal quality table. The signal quality table includes a signal item and a rank item. The signal item includes the signal quality parameters. The rank item includes a plurality of ranks, and the ranks correspond to the signal quality parameters in the signal item in a one-to-one manner. The to-be-selected node serves as a root node of a mesh network based on that the rank corresponding to the signal quality parameter of the to-be-selected node is greater than a rank threshold.

10 Claims, 5 Drawing Sheets

(51) Int. Cl.
*H04W 40/24* (2009.01)
*H04W 48/16* (2009.01)
*H04W 84/18* (2009.01)

(58) Field of Classification Search
CPC . H04W 36/0061; H04W 4/029; H04W 24/08; H04B 7/0695
USPC .......................... 455/7, 456.1, 502; 370/310
See application file for complete search history.

(56) References Cited

U.S. PATENT DOCUMENTS

| | | | |
|---|---|---|---|
| 9,474,009 B2* | 10/2016 | Deenoo | H04W 72/082 |
| 10,045,322 B2* | 8/2018 | Radeluscu | H04W 36/0061 |
| 2013/0029589 A1* | 1/2013 | Bontu | H04W 48/20 |
| | | | 455/7 |
| 2013/0107770 A1* | 5/2013 | Marsden | H04W 8/26 |
| | | | 370/310 |
| 2015/0327210 A1* | 11/2015 | Radeluscu | H04W 52/325 |
| | | | 455/456.1 |
| 2015/0373618 A1* | 12/2015 | Deenoo | H04W 72/082 |
| | | | 455/502 |
| 2018/0213470 A1* | 7/2018 | Reial | H04W 48/16 |
| 2019/0364492 A1* | 11/2019 | Azizi | H04W 4/029 |
| 2020/0205062 A1* | 6/2020 | Azizi | H04W 24/08 |

* cited by examiner

ROOT NODE SELECTION SYSTEM

CROSS-REFERENCE TO RELATED APPLICATION

This non-provisional application claims priority under 35 U.S.C. § 119(a) to Patent Application No. 202011275370.8 filed in China, P.R.C. on Nov. 16, 2020, the entire contents of which are hereby incorporated by reference.

BACKGROUND

Technical Field

The present disclosure relates to the network field, and in particular, to a root node selection system.

Related Art

Nowadays, the Internet of Things (IoT) has become increasingly popular. It is very common that a plurality of network access devices (i.e., nodes) are employed in one place, for example, a place such as a home, an office, a factory or a public facility. A conventional networking ("networking" hereinafter may refer to the operation of connecting connectable apparatuses to a network through specific settings) architecture is not convenient in a multi-node networking. Therefore, a mesh network architecture has gradually become a major trend of multi-node networking.

A mesh network architecture has some advantages over conventional networking architectures. One of the advantages is that the wireless access points do not need to be directly connected with every node in the mesh network. The reason is that the mesh network may have a plurality of root nodes, and the root nodes may share the workload of the wireless access points. However, for a current mesh network, there is no standard operation procedure of selecting a root node from a number of nodes. It is also not clearly specified how many root nodes are sufficient for a mesh network. Therefore, when the selection of a root node for a mesh network is not ideal, the communication status of the mesh network can be hardly satisfied. Therefore, an improved root node selection method for a mesh network is required in this field.

SUMMARY

In view of the above, the present disclosure proposes a root node selection system.

According to some embodiments, the root node selection system is applicable to a mesh network, and the mesh network is in communication connection with a wireless access point. The root node selection system includes a plurality of idle nodes, and each of the idle nodes has a signal quality parameter for communication with the wireless access point. Each of the idle nodes is configured to broadcast a signal beacon and monitor signal beacons broadcast by other idle nodes of the idle nodes, each signal beacon carries the signal quality parameter corresponding to the idle node broadcasting the signal beacon. Any of the idle nodes is used as a to-be-selected node, and the to-be-selected node stores a signal quality table. The signal quality table includes a signal item and a rank item. The signal item includes the signal quality parameter of the to-be-selected node and the signal quality parameters of the other idle nodes by monitoring the signal beacons broadcast by the other idle nodes. The rank item includes a plurality of ranks, and the ranks correspond to the signal quality parameters in the signal item in a one-to-one manner. The to-be-selected node serves as a root node of the mesh network based on that the rank corresponding to the signal quality parameter of the to-be-selected node is greater than a rank threshold.

In summary, according to the root node selection system in some embodiments of the present disclosure, the root node selection system may determine, based on whether the rank of the signal quality parameter in the signal quality table is greater than the rank threshold, whether the idle node can serve as the root node of the mesh network.

DETAILED DESCRIPTION

The present disclosure relates to a root node selection system. Although several preferred implementation modes of the present disclosure are described in this specification, it is understood that the present disclosure may still be implemented in many ways and is not limited to specific embodiments or specific ways of implementing the following features described below. In other cases, well-known details are not described or discussed herein again to avoid obscuring the focus of the present disclosure.

In this specification, the term "connect" is used. In some embodiments, the term "connect" may represent that two or more elements are in communication connection with each other in a wireless or wired manner.

Figure 1:
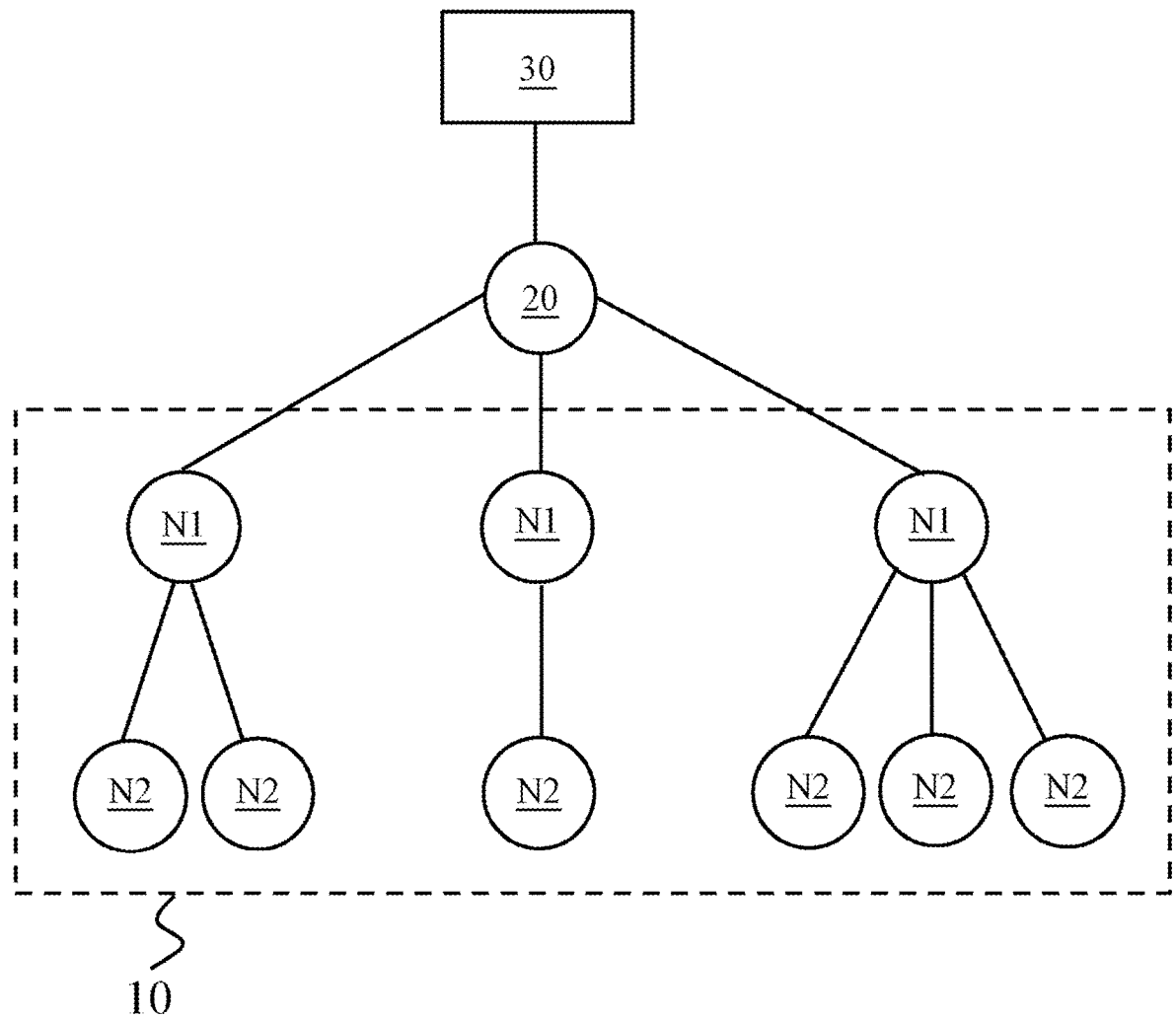
FIG. 1 is a schematic diagram of a mesh network according to some embodiments of the present disclosure.

FIG. 1 is a schematic diagram of a mesh network 10 according to some embodiments of the present disclosure. Referring to FIG. 1, in some embodiments, the mesh network 10 is also referred to as a mesh Wi-Fi network. The mesh network 10 includes a plurality of mesh network nodes, and the mesh network nodes are connected to each other in a tree topology communication manner. The mesh network node includes a root node N1 and a non-root node N2. In the mesh network 10, there may be one or more root nodes N1 and non-root nodes N2. The mesh network 10 is in communication connection with a wireless access point 20. That is, nodes in the mesh network 10 may communicate with far end through the wireless access point 20. In some embodiments, the mesh network 10 is in communication connection with a control node 30 through the wireless access point 20, and the control node 30 may also control the mesh network nodes in the mesh network 10 through the wireless access point 20.

Figure 2:
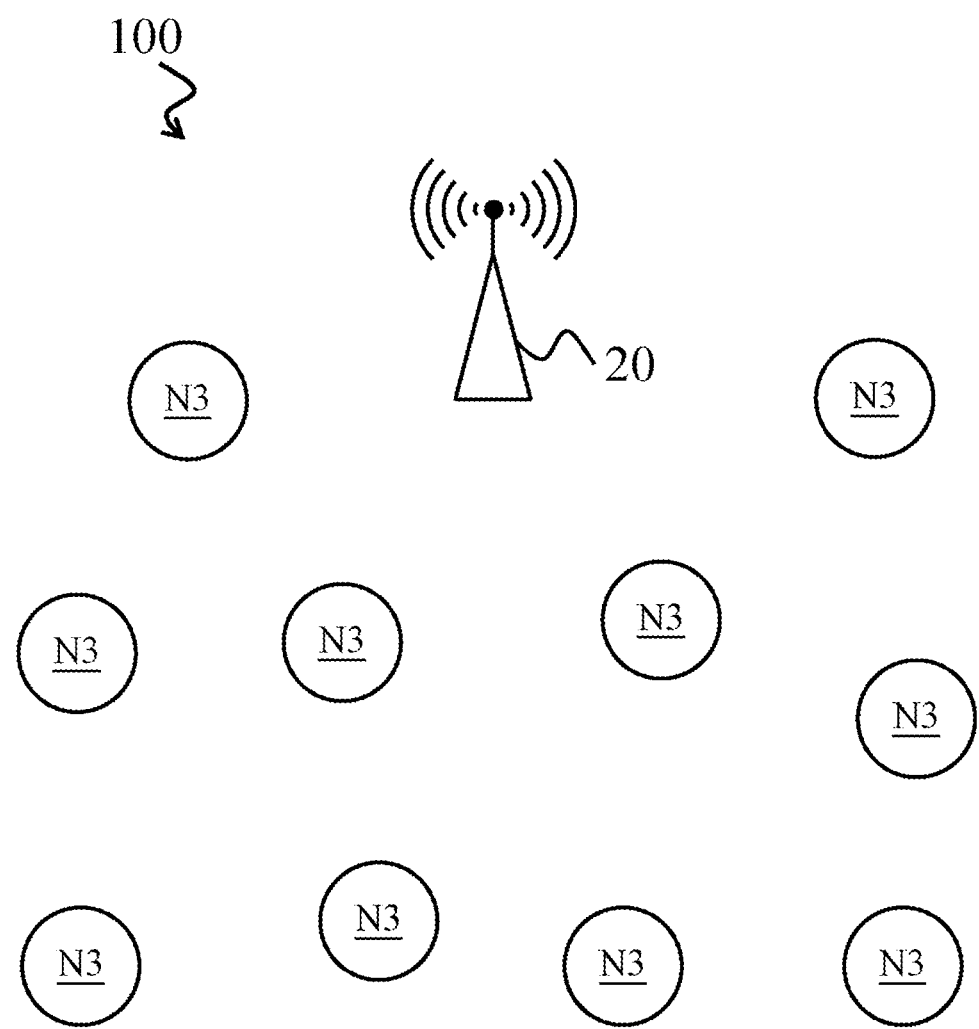
FIG. 2 is a schematic diagram of a root node selection system according to some embodiments of the present disclosure.

FIG. 2 is a schematic diagram of a root node selection system 100 according to some embodiments of the present disclosure. Referring to FIG. 1 and FIG. 2, the root node selection system 100 includes a plurality of idle nodes N3. The root node selection system 100 is applicable to the mesh network 10, and the mesh network 10 is in communication connection with the wireless access point 20. The idle node N3 is a node that is not network-connected. That is, the idle node N3 is not a part of the mesh network 10. After the networking process of the idle node N3 is completed, the idle node N3 after the networking process serves as a mesh network node in the mesh network 10. Specifically, the root node selection system 100 is configured to determine whether an idle node N3 is suitable for serving as the root node N1 before the mesh network 10 is formed. Therefore, after the networking process of the idle node N3 is completed, the networked idle node N3 may determine, according to a selection result of the root node selection system 100, that the idle node N3 after networking process is suitable for serving as the root node N1 or the non-root node N2. In other words, in some embodiments, the mesh network 10 is formed by the idle node N3 after the networking processes of the idle nodes are completed.

In some embodiments, each idle node N3 has a signal quality parameter for communication with the wireless access point 20. Specifically, the signal quality parameter indicates the signal quality of the communication between the wireless access point 20 and the idle node N3. That is, after a wireless access point signal (not shown in the figure) transmitted by the wireless access point 20 is received by the idle node N3, the idle node N3 measures communication signal quality of the wireless access point signal. In other words, signal quality parameters of the idle nodes N3 are obtained through measurement based on wireless access point signals received by the idle nodes. The signal quality parameter is also referred to as a received signal strength indication (RSSI) value.

In some embodiments, each of the idle nodes N3 is configured to broadcast a signal beacon S1 (e.g., similar to the signal beacon S1 shown in FIG. 3), and each of the idle nodes N3 are configured to monitor the signal beacons S1, where each of the signal beacons S1 has a signal quality parameter corresponding to its source. Specifically, each idle node N3 is configured to broadcast its signal beacon S1, and monitor signal beacons S1 broadcast by other idle nodes N3. In some embodiments, the idle node N3 broadcasts the signal beacon S1 through a specific communication channel, so that the signal quality parameter of the idle node N3 may be obtained by other idle nodes N3. Correspondingly, the idle node N3 obtains other signal beacons S1 by monitoring specific communication channels, that is, obtains signal quality parameters of the other idle nodes N3. It is noted that, an idle node N3 is not limited to monitoring the signal beacons S1 broadcast by the other idle nodes N3 or the signal beacon S1 broadcast by itself.

Figure 3:
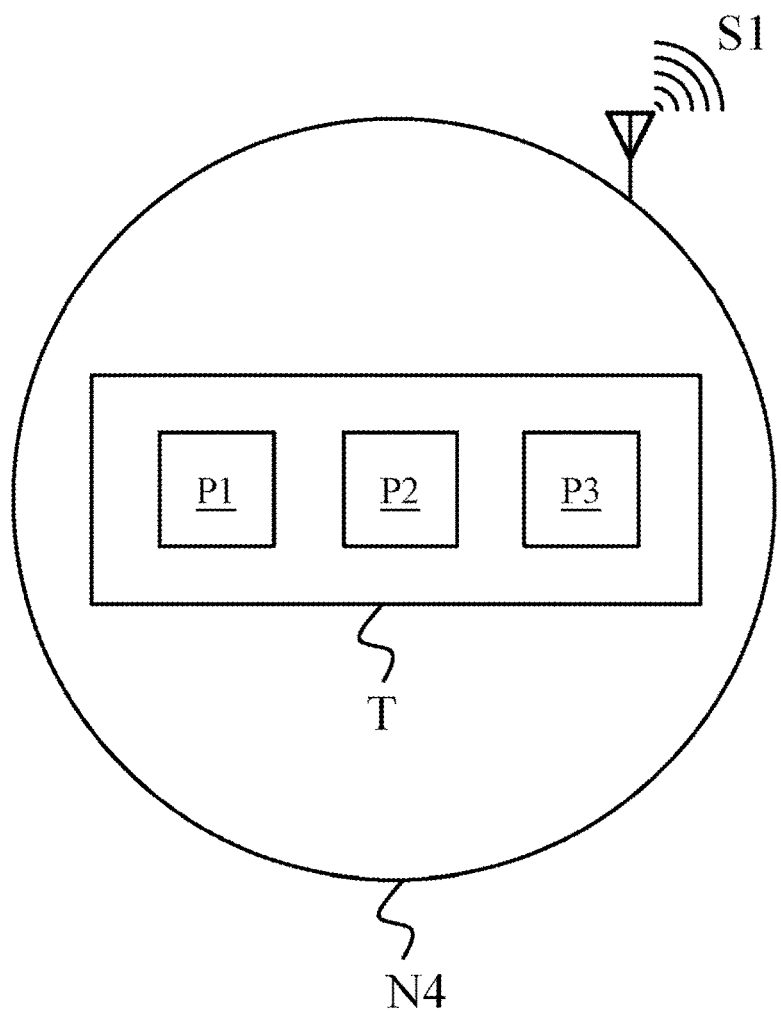
FIG. 3 is a schematic diagram of a to-be-selected node according to some embodiments of the present disclosure.

FIG. 3 is a schematic diagram of a to-be-selected node N4 according to some embodiments of the present disclosure. Referring to FIG. 3, in some embodiments, the root node selection system 100 targets any of the idle nodes N3 as the to-be-selected node N4, and the to-be-selected node N4 stores a signal quality table T. For better understandings, in this specification, description is made by using an example in which one of the idle nodes N3 in the root node selection system 100 is targeted as the to-be-selected node N4. Specifically, any of the idle nodes N3 may be targeted as the to-be-selected node N4. In other words, any of the idle nodes N3 stores its own signal quality table T, and the rest store theirs. The signal quality table T includes a signal item P1 and a rank item P2. The signal item P1 includes a signal quality parameter of the to-be-selected node N4 and signal quality parameters obtained by the to-be-selected node N4 by monitoring the signal beacons S1. The rank item P2 includes a plurality of ranks, and the ranks correspond to the signal quality parameters in the signal item P1 in a one-to-one manner. The ranks are presented in the form of, for example, but not limited to, an arithmetic progression "1, 2, 3, . . . ". It is noted that, the rank item P2 is merely used for describing an arrangement order of the signal item P1. That is, the rank item P2 maybe not actually stored in the signal quality table T. For example, when the to-be-selected node N4 includes a storage element for storing the signal quality table T, the rank item P2 may be used for representing an address of the signal item P1 that is stored in the storage element. Therefore, a rank adjustment may be used for representing an adjustment of the address of the signal quality parameter in the storage element.

In some embodiments, the to-be-selected node N4 determines, according to whether the rank of the signal quality parameter of the to-be-selected node is greater than a rank threshold, that the to-be-selected node serves as the root node N1 of the mesh network 10 or not. That is, the to-be-selected node N4 determines whether the to-be-selected node may serve as the root node N1 of the mesh network 10 after the networking process of the to-be-selected node is completed. In some embodiments, the to-be-selected node N4 sorts the ranks in the rank item P2 according to the values of the signal quality parameters in the signal item P1. That is, the ranks are sorted (or say arranged in a specific order) based on the strength of the signal quality parameters. In other words, the signal quality parameter with higher strength corresponds to a higher rank, for example, the higher rank is represented by a smaller value in the arithmetic progression. Correspondingly, the signal quality parameter with lower strength corresponds to a lower rank, for example, the lower rank is represented by a larger value in the arithmetic progression. For example, when the rank threshold is "4", and the rank of the signal quality parameter of the to-be-selected node N4 is "any value among 1, 2, and 3", it means that the rank of the signal quality parameter of the to-be-selected node N4 is greater than the rank threshold. Correspondingly, when the rank corresponding to the signal quality parameter of the to-be-selected node N4 is less than the rank threshold, the to-be-selected node may serve as the non-root node N2 of the mesh network 10. That is, the to-be-selected node N4 determines that, after the networking process of the to-be-selected node is completed, the to-be-selected node cannot serve as the root node N1 of the mesh network 10, and can only serve as the non-root node N2 of the mesh network 10.

Further referring to FIG. 3, in some embodiments, each idle node N3 has a node address, and the signal beacon S1 sent by each idle node N3 carries its node address. Specifically, the node address corresponds to the signal quality parameter in a one-to-one manner. That is, the idle node N3 has its node address and signal quality parameter, and the idle node N3 broadcasts its node address and its signal quality parameter by using the signal beacon S1. The node address is, for example, but not limited to, a media access control (MAC) address. The signal quality table T includes the signal item P1, the rank item P2, and an address item P3. The address item P3 includes a node address of the to-be-selected node N4 and node addresses obtained by the to-be-selected node N4 for monitoring the signal beacons S1 of others. That is, the to-be-selected node N4 obtains the node addresses of other idle nodes N3 by monitoring the signal beacons S1 broadcast by them. In other words, the to-be-selected node N4 may obtain both signal quality parameters of the other idle nodes N3 and the corresponding node addresses by monitoring the signal beacons S1 broadcast by the other idle nodes N3.

In some embodiments, the to-be-selected node N4 updates the signal quality table T according to the detected signal beacons S1. Specifically, the to-be-selected node N4 analyzes the signal beacon S1 to obtain a signal quality parameter and a node address in the signal beacon S1, and then updates the obtained signal quality parameter and node address to the signal quality table T of the to-be-selected node. It is noted that, when the to-be-selected node N4 updates its signal quality table T, the to-be-selected node N4 may re-order the ranks in the rank item P2 according to the values of the signal quality parameters in the signal item P1.

In some embodiments, the root node selection system 100 selects, according to the values of the signal quality parameters, the idle node N3 suitable for serving as the root node N1. Specifically, the root node selection system 100 selects the idle node N3 suitable for serving as the root node N1 based on the following conditions: whether the signal quality parameter is greater than a first threshold; whether the signal quality parameter falls between a first threshold and a second threshold (generally, the second threshold is lower than the first threshold); and whether the signal quality parameter is less than a second threshold.

In some embodiments, the root node selection system 100 first determines whether any of the signal quality parameters is greater than a first threshold. If at least one of the signal quality parameters is greater than the first threshold, the idle node N3 whose signal quality parameter is greater than the first threshold may serve as the root node N1 of the mesh network 10. Therefore, the idle node N3 whose signal quality parameter is less than the first threshold cannot serve as the root node N1 but can only serve as the non-root node N2 of the mesh network 10. In other words, once the root node selection system 100 determines at least one of the signal quality parameters is greater than the first threshold, the other idle nodes N3 whose signal quality parameters are less than the first threshold cannot serve as the root node N1 of the mesh network 10, even if the ranks corresponding to those signal quality parameters of the other idle nodes are greater than the rank threshold.

In some embodiments, if the root node selection system 100 determines that the signal quality parameter of every idle node N3 is less than the first threshold, the root node selection system 100 further determines whether the signal quality parameters are between the first threshold and the second threshold or are less than the second threshold. For the idle nodes N3 whose signal quality parameters fall between the first threshold and the second threshold, the root node selection system 100 determines, according to that the rank corresponding to the signal quality parameter of the idle node N3 is greater than the rank threshold, the idle node N3 that serves as the root node N1 of the mesh network 10. Then, for the idle nodes N3 whose signal quality parameters are less than the second threshold, the root node selection system 100 determines that the idle nodes N3 serve as the non-root nodes N2 of the mesh network 10.

Figure 4:
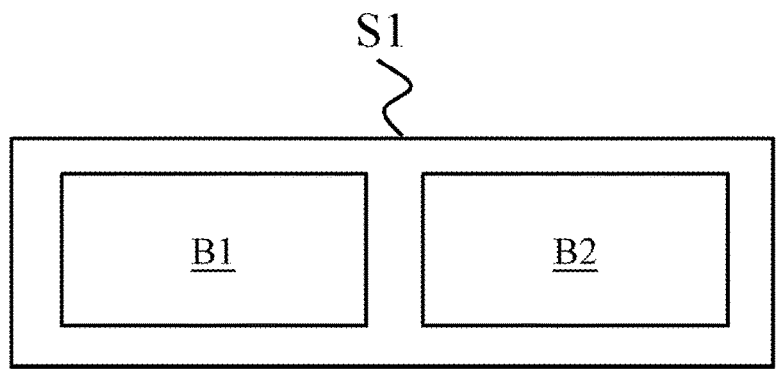
FIG. 4 is a schematic diagram of a signal beacon according to some embodiments of the present disclosure.

FIG. 4 is a schematic diagram of a signal beacon S1 according to some embodiments of the present disclosure. Referring to FIG. 4, in some embodiments, the signal beacon S1 has a first block B1 and a second block B2. The first block B1 includes the signal quality parameter of the to-be-selected node N4 and the node address of the to-be-selected node N4. The second block B2 includes signal quality parameters whose ranks in the signal quality table T are greater than a beacon threshold and node addresses of the idle nodes N3 corresponding to the signal quality parameters. That is, in addition to that the to-be-selected node N4 broadcasts its signal quality parameter and node address by using the signal beacon S1, the to-be-selected node N4 may also broadcast the signal quality parameters of the other idle nodes N3 in the signal quality table T and the node addresses by using the signal beacons S1. For example, when the beacon threshold is "4", the second block B2 includes signal quality parameters corresponding to the idle nodes N3 whose ranks are "1, 2, and 3" in the signal quality table T and their node addresses. In some embodiments, the beacon threshold is a fixed parameter stored in the idle node N3, for example, but not limited to, "4". In some embodiments, the beacon threshold is equal to the rank threshold, or the beacon threshold corresponds to the rank threshold. That is, the beacon threshold is determined according to the rank threshold.

In some embodiments, the to-be-selected node N4 generates the signal beacon S1 according to the signal quality table T, where the first block B1 of the signal beacon S1 is generated by using its signal quality parameter and node address, and the second block B2 of the signal beacon S1 is generated by using the signal quality parameters whose ranks are greater than the beacon threshold and their node addresses.

In some embodiments, the to-be-selected node N4 in the root node selection system 100 detects, for example, but not limited to, the signal beacons S1 of all other idle nodes N3. That is, the to-be-selected node N4 may detect only the signal beacons S1 of some other idle nodes N3. In other words, the to-be-selected node N4 may fail to sense some of the idle nodes N3 (e.g., due to a distance limitation or environment shading). Therefore, when any the idle nodes N3 that can be sensed by the to-be-selected nodes who can detect the signal beacons S1 of other idle nodes N3 that cannot be sensed by the to-be-selected node N4 (hereinafter "the idle nodes N3 that can be sensed by the to-be-selected node N4" are referred to as "idle nodes N3 that can be sensed", and "the idle nodes N3 that cannot be sensed by the to-be-selected node N4" are referred to as "idle nodes N3 that cannot be sensed"), "the idle nodes N3 that can be sensed" can store the signal quality parameters and the node addresses of the signal beacons S1 of "the idle nodes N3 that cannot be sensed" in its signal quality table T, and the signal beacons S1 generated according to the signal quality table T are broadcast to the to-be-selected node N4. Therefore, the root node selection system 100 may establish a transmission of the signal quality parameters and the node addresses from "the idle nodes N3 that cannot be sensed" to the to-be-selected node N4 by using the signal beacons S1 of both "the idle nodes N3 that cannot be sensed" and "the idle nodes N3 that can be sensed".

In some embodiments, when the ranks of the signal quality parameters of "the idle nodes N3 that cannot be sensed" are less than the beacon threshold in the signal quality table T of "the idle nodes N3 that can be sensed", it represents that the signal quality parameters of "the idle nodes N3 that cannot be sensed" are less important. That is, these signal quality parameters show weak strengths. Therefore, even if the to-be-selected node N4 fails to obtain the signal quality parameters of "the idle nodes N3 that cannot be sensed", it does not change the rank of the signal quality parameter of the to-be-selected node N4 in the signal quality table T.

Figure 5:
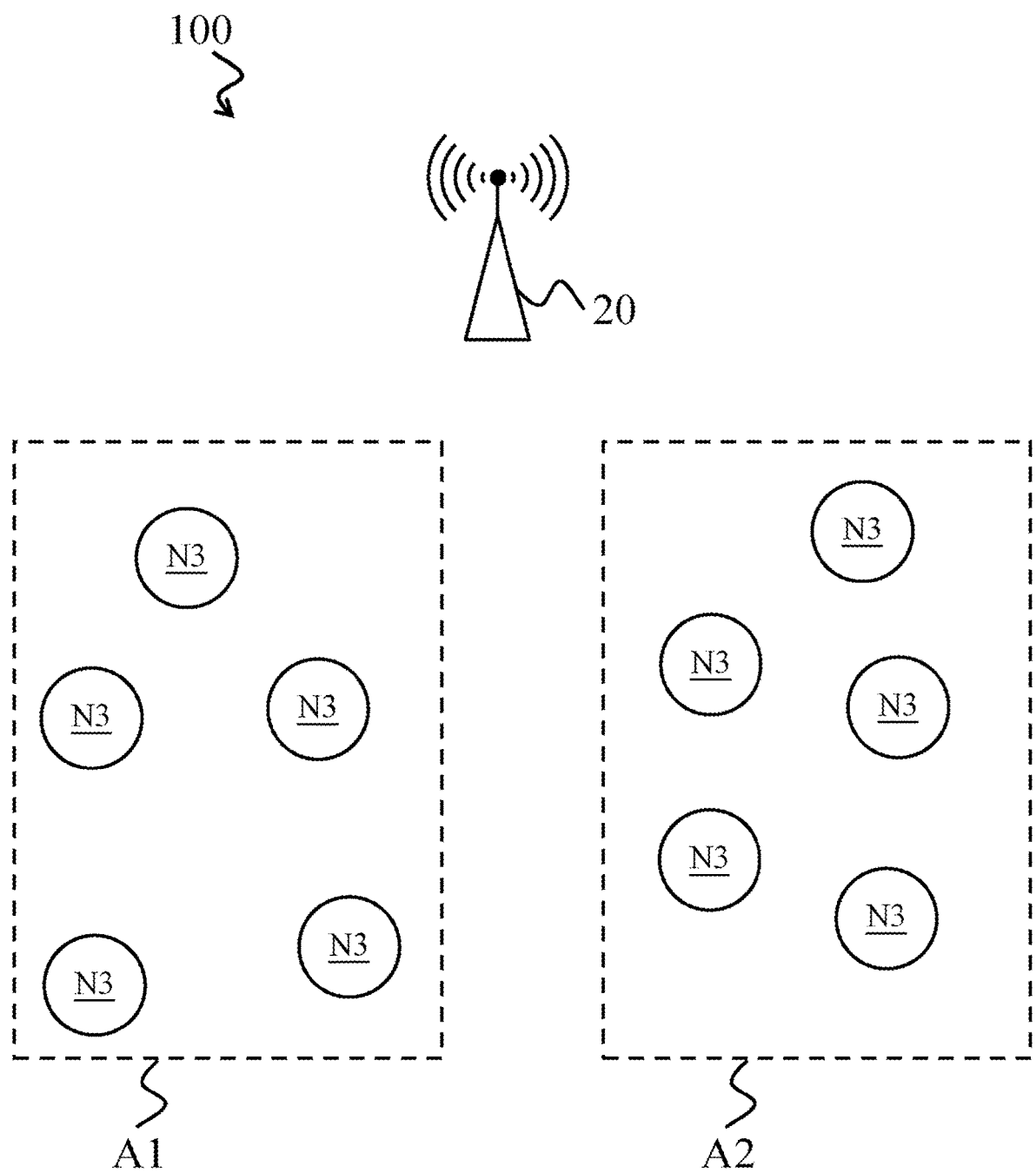
FIG. 5 is a schematic diagram of a root node selection system according to some other embodiments of the present disclosure.

FIG. 5 is a schematic diagram of a root node selection system 100 according to some other embodiments of the present disclosure. In some embodiments, referring to FIG.

5, when a coverage area of the root node selection system 100 includes a first area A1 and a second area A2. The idle nodes N3 are scattered in the first area A1 and the second area A2. When there is no connection between the idle nodes N3 in the first area A1 and the idle nodes N3 in the second area A2, it means that all the idle nodes N3 in the first area A1 cannot sense any of the idle nodes N3 in the second area A2, and vice versa. Therefore, the root node selection system 100 may select the root node N1 from the idle nodes N3 in the first area A1 and the second area A2 respectively. That is, the root node selection system 100 determines signal quality parameters of the idle nodes N3 in the first area A1 according to the first threshold and the second threshold, and determines whether the idle nodes N3 in the first area A1 are suitable for serving as the root node N1 of the mesh network 10. The root node selection system 100 is not affected by the signal quality parameters of the idle nodes N3 in the second area A2, and vice versa.

Figure 6:
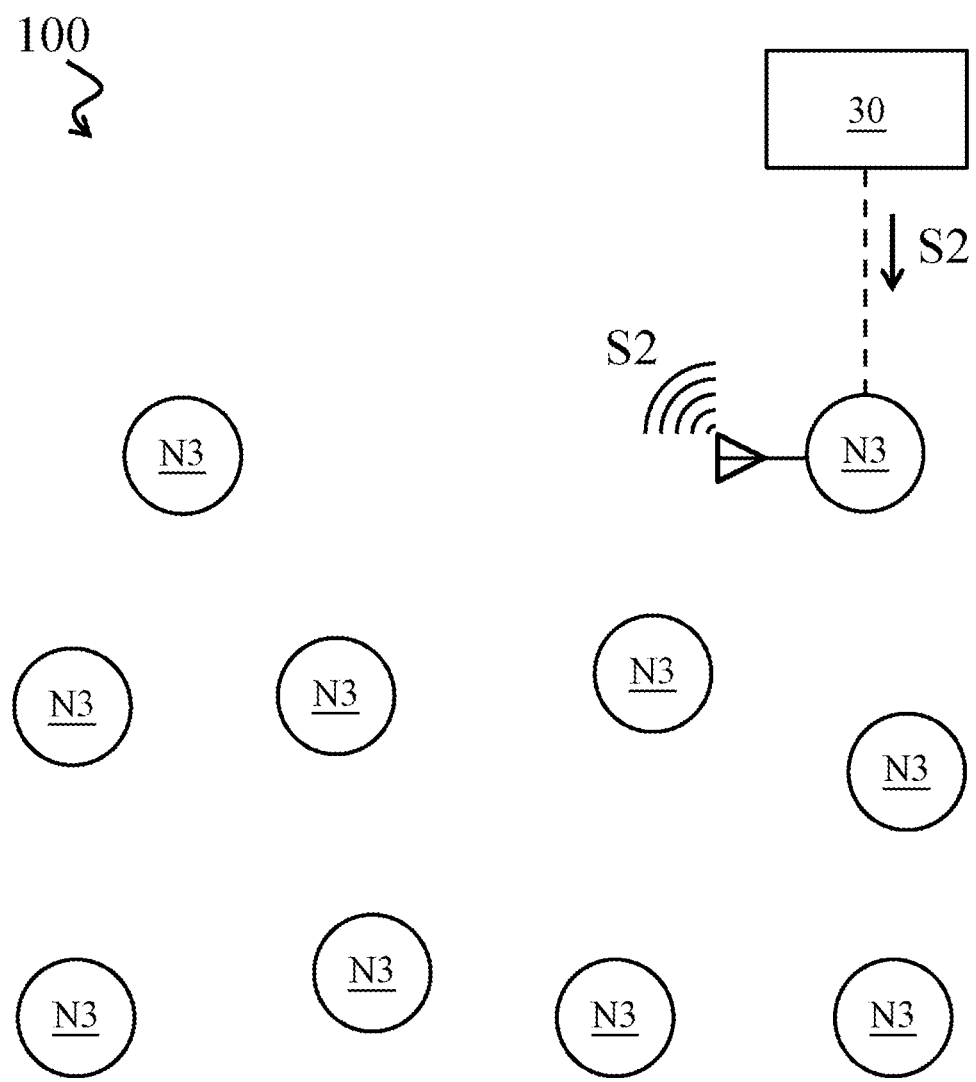
FIG. 6 is a schematic diagram of a root node selection system according to some other embodiments of the present disclosure.

FIG. 6 is a schematic diagram of a root node selection system 100 according to some other embodiments of the present disclosure. In some embodiments, referring to FIG. 6, the root node selection system 100 includes a plurality of idle nodes N3 and a control node 30. The control node 30 is configured to output a control beacon S2, and the control beacon S2 carries a root node quantity. The idle node N3 receives the control beacon S2, and obtains a corresponding rank threshold according to the root node quantity. In some embodiments, the control node 30 obtains the root node quantity according to a quantity of idle nodes N3 whose signal quality parameters are between the first threshold and the second threshold.

In some embodiments, the control node 30 obtains the signal quality parameter and the node address of each idle node N3 by receiving the signal beacon S1 of the each idle node N3, but the present disclosure is not limited thereto. The control node 30 can also receive the signal beacon S1 of the each idle node N3 through the wireless access point 20. In some embodiments, when the control node 30 determines that the signal quality parameter of any of the idle nodes N3 in the root node selection system 100 is greater than the first threshold, the control node 30 can set the root node quantity to "0", and the idle node N3 obtains a corresponding rank threshold "0" according to the root node quantity. Therefore, for the idle nodes N3 whose signal quality parameters fall between the first threshold and the second threshold, the idle nodes cannot serve as the root node N1 of the mesh network 10. When the control node 30 determines that the signal quality parameter of no idle node N3 in the root node selection system 100 is greater than the first threshold, the control node 30 calculates a quantity of idle nodes N3 whose signal quality parameters in the root node selection system 100 fall between a first threshold and a second threshold, and obtains the root node quantity.

In some embodiments, the percentage of "the root node quantity" in "the quantity of idle nodes N3 whose signal quality parameters fall between the first threshold and the second threshold" is approximately 10-20%, but the present disclosure is not limited thereto. In some embodiments, "the root node quantity" is equal to "the rank threshold".

In some embodiments, the control node 30 uses any of the idle nodes N3 as the networking node. The control node 30 is in communication connection with the networking node, and outputs a control signal S2 to the networking node. The networking node broadcasts the control beacon S2 to the other idle nodes N3. The method in which the control node 30 is in communication connection with the networking node is, for example, but not limited to, a Wi-Fi protected setup (Wi-Fi simple config). That is, the control node 30 may broadcast the control beacon S2 to the other idle nodes N3 through the networking node without outputting the control beacon S2 one by one to each idle node N3.

In summary, according to the root node selection system in some embodiments of the present disclosure, the root node selection system may determine, based on whether the rank of the signal quality parameter in the signal quality table is greater than the rank threshold, whether the idle node can serve as the root node of the mesh network. In some embodiments, the root node selection system may select, according to that the signal quality parameter of each idle node is greater than the first threshold, is between the first threshold and the second threshold, or is less than the second threshold, the idle node suitable for serving as the root node. In some embodiments, the root node selection system may control, according to the quantity of idle nodes whose signal quality parameters fall between the first threshold and the second threshold, a quantity of the root nodes in the mesh network.

Although the present disclosure has been described in considerable detail with reference to certain preferred embodiments thereof, the disclosure is not for limiting the scope of the disclosure. Persons having ordinary skill in the art may make various modifications and changes without departing from the scope and spirit of the disclosure. Therefore, the scope of the appended claims should not be limited to the description of the preferred embodiments described above.

What is claimed is:

1. A root node selection system, applicable to a mesh network, wherein the mesh network is communicatively connected to a wireless access point, and the root node selection system comprises:
   a plurality of idle nodes, each idle node having a signal quality parameter for communicating with the wireless access point, wherein the each idle node is configured to broadcast a signal beacon and monitor the signal beacons broadcast by other idle nodes, each signal beacon carries the signal quality parameter corresponding to the idle node broadcasting the signal beacon, wherein
   any of the idle nodes is used as a to-be-selected node, the to-be-selected node stores a signal quality table, and the signal quality table comprises:
   a signal item, comprising the signal quality parameter of the to-be-selected node and the signal quality parameters obtained by the to-be-selected node for monitoring the signal beacons broadcast by the other idle nodes; and
   a rank item, comprising a plurality of ranks, wherein the ranks correspond to the signal quality parameters in the signal item in a one-to-one manner, wherein
   the to-be-selected node serves as a root node of the mesh network based on that the rank corresponding to the signal quality parameter of the to-be-selected node is greater than a rank threshold.

2. The root node selection system according to claim 1, wherein the signal quality parameter of the to-be-selected node falls between a first threshold and a second threshold and the second threshold is less than the first threshold.

3. The root node selection system according to claim 1, wherein the idle node whose signal quality parameter is greater than a first threshold serves as the root node of the mesh network.

4. The root node selection system according to claim 1, wherein the idle node whose signal quality parameter is less than a second threshold serves as a non-root node of the mesh network.

5. The root node selection system according to claim 1, further comprising:
   a control node, configured to output a control beacon, wherein the control beacon carries a root node quantity, and the idle nodes receive the control beacon, and obtain the rank threshold according to the root node quantity.

6. The root node selection system according to claim 5, wherein the control node obtains the root node quantity based on a quantity of the idle nodes corresponding to the signal quality parameters falling between a first threshold and a second threshold.

7. The root node selection system according to claim 5, wherein the control node uses any of the idle nodes as a networking node, the control node is communicatively connected to the networking node and outputs the control beacon to the networking node, and the networking node broadcasts the control beacon to the other idle nodes.

8. The root node selection system according to claim 1, wherein each idle node has a node address, each signal beacon carries the node address corresponding to the idle node broadcasting the signal beacon, the signal quality table further has an address item, and the address item comprises the node address of the to-be-selected node and the node addresses obtained by the to-be-selected node for monitoring the signal beacons broadcast by the other idle nodes.

9. The root node selection system according to claim 1, wherein each idle node has a node address, and the signal beacon of the to-be-selected node comprises:
   a first block, comprising the signal quality parameter of the to-be-selected node and the node address of the to-be-selected node; and
   a second block, comprising the signal quality parameters whose ranks are greater than a beacon threshold in the signal quality table and the node addresses of the idle nodes corresponding to the signal quality parameters.

10. The root node selection system according to claim 1, wherein the to-be-selected node sorts the ranks in the rank item based on the signal quality parameters in the signal item.

\* \* \* \* \*